June 20, 1967 S. GUARNASCHELLI 3,326,583

HIGH PRESSURE COMPRESSION FITTING FOR TUBING

Filed Aug. 24, 1964

INVENTOR.
STEPHEN A. GUARNASCHELLI
BY James P. Malone

Patent 3,326,583

3,326,583
HIGH PRESSURE COMPRESSION FITTING FOR TUBING
Stephen Guarnaschelli, 33 Vassar St., Garden City, N.Y. 11530
Filed Aug. 24, 1964, Ser. No. 391,561
1 Claim. (Cl. 285—342)

This invention relates to high pressure compression fitting for tubing with metal to metal seals.

High pressure fittings for tubing are generally made with gaskets which are liable to become weakened and blow out causing leakage in the system.

The present invention eliminates the use of gaskets and provides a high pressure fitting which may be easily installed on the job.

Another conventional compression fitting sleeve type is one which bites into the tubing with either a single or double concentric sharp V-shaped edge.

The depth of the bite is so small it looks like a scratch mark and should the tube diameter vary i.e. be undersized, it no longer holds the fitting to the tube.

My system differs in principle. In my device locking is provided by deep helical or concentric grooves or threads which are rolled into the tubing resembling a threaded bolt with a coarse thread plus a nut split in halves to match its thread or grooves. Therefore, any variation in the diameter of the tube or solid rods does not make the fittings useless.

More specifically, the present invention generally comprises a fitting comprising a first member adapted to screw into an existing block such as an engine block or a tank, said member having an internal taper and internal threads. A nut member is provided having external threads adapted to put the internal threads of the said first member. A feature of the invention is a compression ring on the tubing which fits the internal taper of the first member. The compression ring is squeezed and locked into position by a pair of half nuts which fit on rolled on threads which are formed on the tubing by means of rotatable die members in a conventional manual cutter. The advantage of the rolled on threads is that no material is removed in forming the threads and the outside diameter of the threads is greater than the outside diameter of the tubing. Use is made of this feature to prevent the tubing from being blown through the nut member if the half nuts are stripped since the inside diameter of the nut member is made smaller than the outside diameter of the rolled on threads. Therefore, the joint has a plurality of substantially independent locking means.

Accordingly, a principal object of the invention is to provide new and improved high pressure fittings for tubing.

Another object of the invention is to provide new and improved high pressure fittings for tubing having metal to metal seals, eliminating the use of gaskets.

Another object of the invention is to provide a new and improved high pressure fitting for tubing utilizing a ring member which is adapted to be squeezed onto said tubing.

Another object of the invention is to provide a new and improved high pressure fitting with a plurality of substantially independent locking means.

Another object of the invention is to provide a new and improved high pressure fitting for tubing comprising a first hollow member adapted to fit into an existing block, said member having an internal taper and internal threads, a nut member having external threads adapted to fit said internal threads of said first member, said tubing having rolled on threads spaced a predetermined distance from said end of tubing, said threads being formed so that their outside diameter is greater than the outside diameter of said tubing, a ring member having an external taper mounted adjacent the end of said tubing, said tapered ring member being adapted to fit the internal taper of said first member, a pair of half nuts mounted on said rolled on threads, said nut member having a recess adapted to receive said half nuts and the inside diameter of said nut member being smaller than the outside diameter of said rolled on threads.

These and other objects of the invention will be apparent from the following specification and drawings of which:

Figure 1:
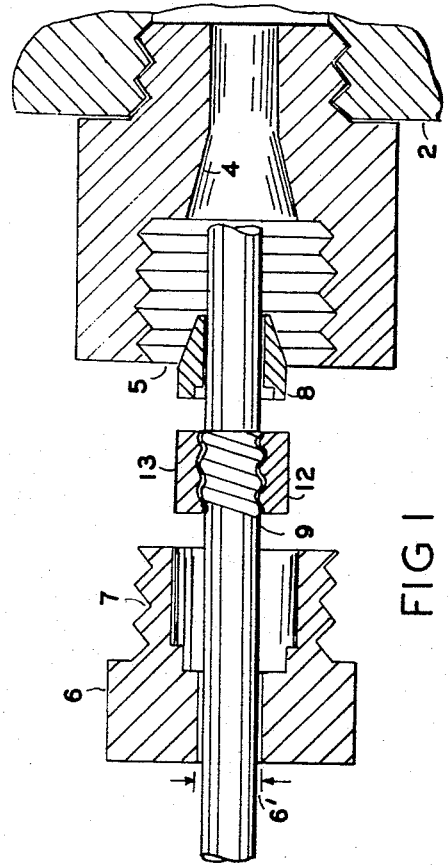
FIGURE 1 is a sectional view illustrating an embodiment of the invention in exploded form.

Referring to the figures, the invention generally comprises a first member 1 which is adapted to be screwed into an existing block 2 which may be for instance an engine block or a tank housing. The member 1 is hollow and has external threads 3 which are adapted to fit existing threads on the block 2. The member 1 has an internal taper 4 and internal threads 5.

A nut member 6 has external threads 7 which are adapted to fit the internal threads 5 of the member 1. Compression ring 8 fits near the end of the tubing 9. The tubing 9 has rolled on threads 11 which are formed by die members as will be explained. A pair of half nuts 12 and 13 are mounted on the rolled on threads. The nut member 6 is recessed to accommodate the half nuts 12 and 13 and the small diameter 6' of the nut member 6 is made smaller than the outside diameter of the threads 11 as will be discussed.

Figure 2:
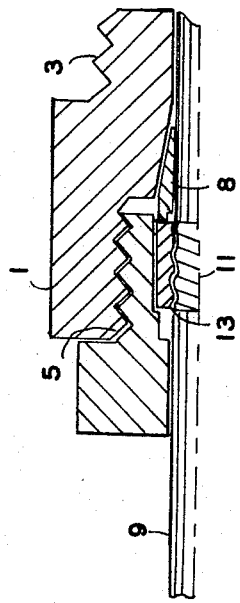
FIGURE 2 is a view similar to FIGURE 1 with the member shown in connected position.

FIGURE 2 shows the parts in connected position with the half nuts 12 and 13 squeezing the ring 8 onto the tubing. The ring 8 has an external taper which is adapted to fit the internal taper of the member 1 to provide a metal to metal seal. As the nut member 6 is tightened up, it squeezes the half nuts 12 and 13 which in turn squeezes the ring member 8 so that it is wedged between the internal taper of the member 1 and the tubing. This provides a very tight connection between the ring 8 and the tubing 9 so that when the fitting is disassembled it is quite difficult to remove the ring 8 from the tubing.

Figure 3:
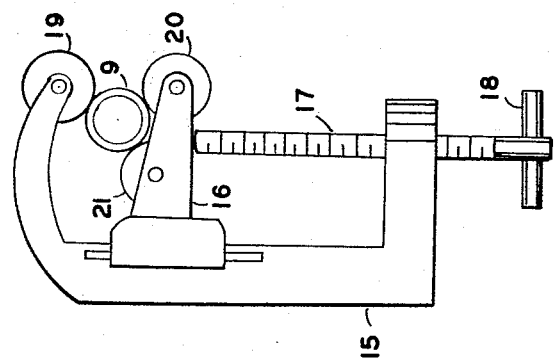
FIGURE 3 is a diagram illustrating a method of providing the rolled on thread used in the embodiments of FIGURES 1 and 2.

FIGURE 3 illustrates a manual device for forming the rolled on threads. This device comprises a modified conventional tubing cutter 15 which includes a U-shaped frame which mounts a slidable member 16 which is adapted to be moved by means of the screw 17 and handle 18. The outer end of the frame supports a thread die 19 and on the slide 16 are mounted a thread die 20 and a flat roller 21 so that the tubing 9 is mounted between the three rotatable members 19, 20, and 21. The threads are formed by tightening up the handle so that there is pressure exerted by the three rotatable members on the tubing and then rotating the frame 15 around the tubing several turns. Several passes may be made to form suitable threads. The roller 21 is used to prevent the threads from becoming too sharp and thin in order to provide maximum strength.

Note, that no material is removed in forming these threads with the result that the outside diameter of the threads 11 is greater than the outside diameter of the tubing 9. This provides a safety feature in that even if the internal threads on the half nuts 12 and 13 are stripped, the tubing will still not be blown through the nut member 6, since the internal diameter 6' of the nut member 6 is made smaller than the outside diameter of the threads 11. Therefore, the nut 6 must be placed on the tubing 9 before the threads 11 are formed.

An advantage of the present invention is that the rolled on threads may be easily placed on the tubing with a simple manually operated tool as shown in FIGURE 3. This may be done on the job and precutting of the tubing and shop work on special lengths of the tubing are avoided.

Another advantage of the device is that practically unlimited pressure can be placed on the metal to metal seal, to squeeze the compression ring between the member 1 and the tubing, thereby providing an excellent seal without the use of any gaskets with a plurality of substantially independent locking means.

An embodiment of the invention has been successfully tested to 50,000 p.s.i. The elements are preferably made of cold steel or equivalent.

Many modifications may be made by those who desire to practice the invention without departing from the scope thereof which is defined by the following claim.

I claim:

A tube fitting comprising, a first member, a bore and a counterbore in said member, a junction between said bore and said counterbore including a tapered bore the largest diameter of which is adjacent said counterbore, a tube externally sized to be received in said bore, annular ridge means rolled on said tube adjacent one end thereof, the crest diameter of said ridge means being greater than outside diameter of said tube, a ring member adapted to be mounted on said tube, said ring member having an externally tapered surface adapted to fit in said tapered bore, collar means having a bore therethrough adapted to encircle said annular ridge means, said collar being longitudinally divided into at least two parts, the walls forming the bore in said collar means having formed therein annular ridge means adapted to mate with the ridge means on said tube, said collar means having one end face forming an abutment for said ring means, means retaining said collar means assembled on said tube ridge means, means to apply axial pressure to the other end of said collar means to retain the parts in assembled relation, and means to couple said first member to another fluid member.

References Cited

UNITED STATES PATENTS

| 1,853,411 | 4/1932 | Gentry et al. | 285—356 X |
| 2,025,382 | 12/1935 | Fletcher et al. | 285—342 |
| 2,126,857 | 8/1938 | Yancey | 285—356 X |
| 2,337,362 | 12/1943 | Willinger | 72—121 |
| 2,363,586 | 11/1944 | Guarnaschelli | 285—356 X |
| 2,478,149 | 8/1949 | Wolfram et al. | 285—342 |
| 3,164,042 | 1/1965 | Hanna et al. | 72—121 |
| 3,208,773 | 9/1965 | Boudrie | 285—356 X |

FOREIGN PATENTS

| 681,220 | 1/1930 | France. |
| 14,161 | 6/1912 | Great Britain. |

CARL W. TOMLIN, *Primary Examiner.*

THOMAS F. CALLAGHAN, *Examiner.*